(12) United States Patent
Basu et al.

(10) Patent No.: US 10,019,377 B2
(45) Date of Patent: Jul. 10, 2018

(54) MANAGING CACHE COHERENCE USING INFORMATION IN A PAGE TABLE

(71) Applicant: Advanced Micro Devices, Inc., Sunnyvale, CA (US)

(72) Inventors: Arkaprava Basu, Austin, TX (US); Bradford M. Beckmann, Redmond, WA (US); Shuai Che, Bellevue, WA (US); Sooraj Puthoor, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 50 days.

(21) Appl. No.: 15/162,464

(22) Filed: May 23, 2016

(65) Prior Publication Data

US 2017/0337136 A1 Nov. 23, 2017

(51) Int. Cl.
*G06F 12/1009* (2016.01)
*G06F 12/0837* (2016.01)
*G06F 12/14* (2006.01)
*G06F 12/0817* (2016.01)
*G06F 12/1027* (2016.01)

(52) U.S. Cl.
CPC ...... *G06F 12/1009* (2013.01); *G06F 12/0837* (2013.01); *G06F 12/0817* (2013.01); *G06F 12/1027* (2013.01); *G06F 12/1483* (2013.01); *G06F 2212/1024* (2013.01); *G06F 2212/1052* (2013.01); *G06F 2212/621* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 9,400,702 B2 * | 7/2016 | Chen | G06F 9/544 |
| 2010/0235586 A1 * | 9/2010 | Gonion | G06F 12/0831 711/144 |
| 2014/0040593 A1 * | 2/2014 | Sharp | G06F 12/1009 711/206 |
| 2015/0309940 A1 * | 10/2015 | Kumar | G06F 12/1009 345/506 |

OTHER PUBLICATIONS

Kelm, J. et al., Cohesion: A Hybrid Memory Model for Accelerators, ISCA '10, Jun. 2010.
Power, J. et al., Heterogeneous System Coherence for Integrated CPU-GPU Systems, MICRO-46, Dec. 2013.

* cited by examiner

*Primary Examiner* — Prasith Thammavong
*Assistant Examiner* — Edmund H Kwong
(74) *Attorney, Agent, or Firm* — Park, Vaughan, Fleming & Dowler LLP

(57) ABSTRACT

The described embodiments include a computing device with two or more types of processors and a memory that is shared between the two or more types of processors. The computing device performs operations for handling cache coherency between the two or more types of processors. During operation, the computing device sets a cache coherency indicator in metadata in a page table entry in a page table, the page table entry information about a page of data that is stored in the memory. The computing device then uses the cache coherency indicator to determine operations to be performed when accessing data in the page of data in the memory. For example, the computing device can use the coherency indicator to determine whether a coherency operation is to be performed when a processor of a given type accesses data in the page of data in the memory.

20 Claims, 6 Drawing Sheets

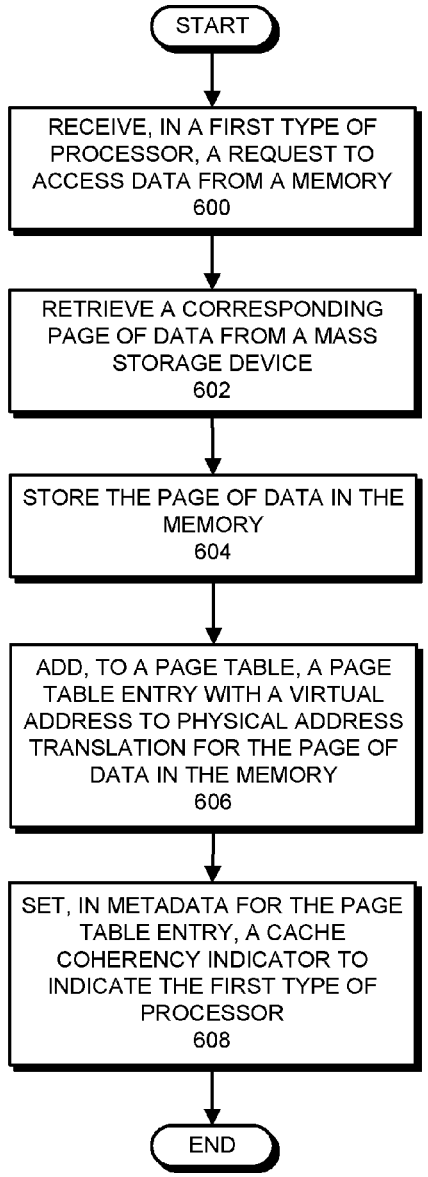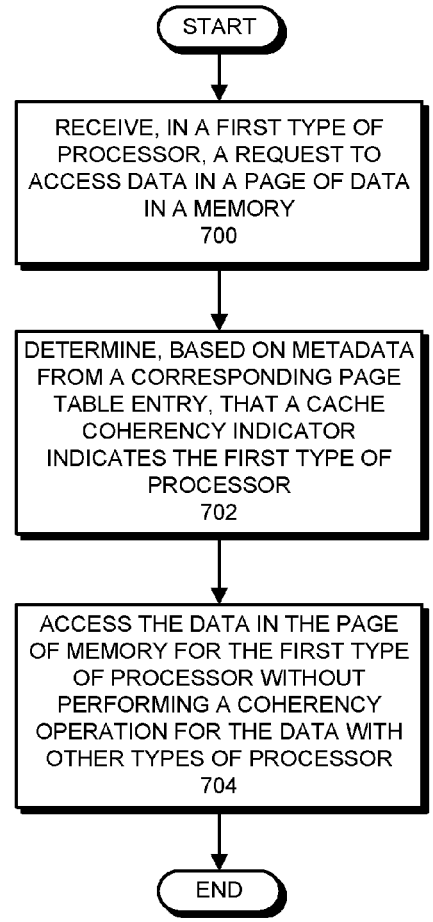
FIG. 6
FIG. 7

MANAGING CACHE COHERENCE USING INFORMATION IN A PAGE TABLE

BACKGROUND

Field

The described embodiments relate to computing devices. More specifically, the described embodiments relate to managing data coherence using information in a page table.

Related Art

Some computing devices include multiple heterogeneous processors that are used for performing computational operations. For example, a computing device may include one or more central processing units (CPUs), graphics processing units (GPUs), media processors, and/or other processors of different types, features, power consumption, etc. Some of these computing devices provide the processors with access to a shared memory. In such computing devices, the processors may locally cache copies of data acquired from the shared memory (i.e., store the copies in a cache) and subsequently modify the cached data. To avoid inconsistencies between cached copies of data and/or the shared memory, the computing devices also provide cache coherency mechanisms. Generally, a cache coherency mechanism performs operations to ensure that modifications made by a given processor to a cached copy of data are appropriately propagated to the shared memory and/or caches of other processors. Depending on the implementation, the computing devices may provide a hardware cache coherency mechanism and/or a software cache coherency mechanism.

For hardware cache coherency mechanisms, the coherency mechanism is implemented in one or more integrated chips or other hardware functional blocks. For example, some computing devices provide a directory-based cache coherency mechanism, in which one or more coherence directory functional blocks are used for maintaining coherency between cached copies of data. In these computing devices, each coherence directory maintains records identifying copies of data held by at least one of the processors and the current state of such data (modified or unmodified, shared, etc.). When a requesting processor is to access data (e.g., write the data, read the data, etc.), the requesting processor sends a request to the corresponding coherence directory and the coherence directory causes the data, when the data is stored in a cache in a corresponding other processor, to be returned to the requesting processor from the cache in the other processor (e.g., when the other processor has a modified copy of the data). The requesting processor caches the data locally (i.e., stores the received data in a local cache) and accesses the cached data.

For software cache coherency mechanisms, the coherency mechanism is implemented, at least in part, by executing corresponding program code in a processor. For example, some computing devices provide a coherency routine (e.g., an operating system extension, a daemon, etc.), that is used by application programs for performing operations for maintaining coherency between cached copies of data and the memory. In these computing devices, software applications (e.g., application programs, firmware, etc.) are programmed to use an application programming interface (API) provided by the coherency routine to perform coherency operations when accessing data.

As computing devices include larger numbers and types of heterogeneous processors, it becomes more difficult to avoid overwhelming existing hardware cache coherency mechanisms. For example, communication buses and hardware coherency directories can be inundated with communication traffic and request processing in larger systems, delaying responses from hardware coherency directories and therefore delaying corresponding computational operations that depend on data accesses. Although software coherency mechanisms can reduce the load on hardware coherency mechanisms, software coherency mechanisms can be difficult, error prone, and expensive to add to software applications. In addition, software coherency mechanisms are slower than their hardware counterparts. For these reasons, existing cache coherency mechanisms have proven unsatisfactory for computing devices with heterogeneous processors.

BRIEF DESCRIPTION OF THE FIGURES

FIG. 6 presents a flowchart illustrating a process for setting a cache coherency indicator in an entry in a page table in accordance with some embodiments.

FIG. 7 presents a flowchart illustrating a process for controlling access to data using a cache coherency indicator in accordance with some embodiments.

Throughout the figures and the description, like reference numerals refer to the same figure elements.

DETAILED DESCRIPTION

Figure 1:
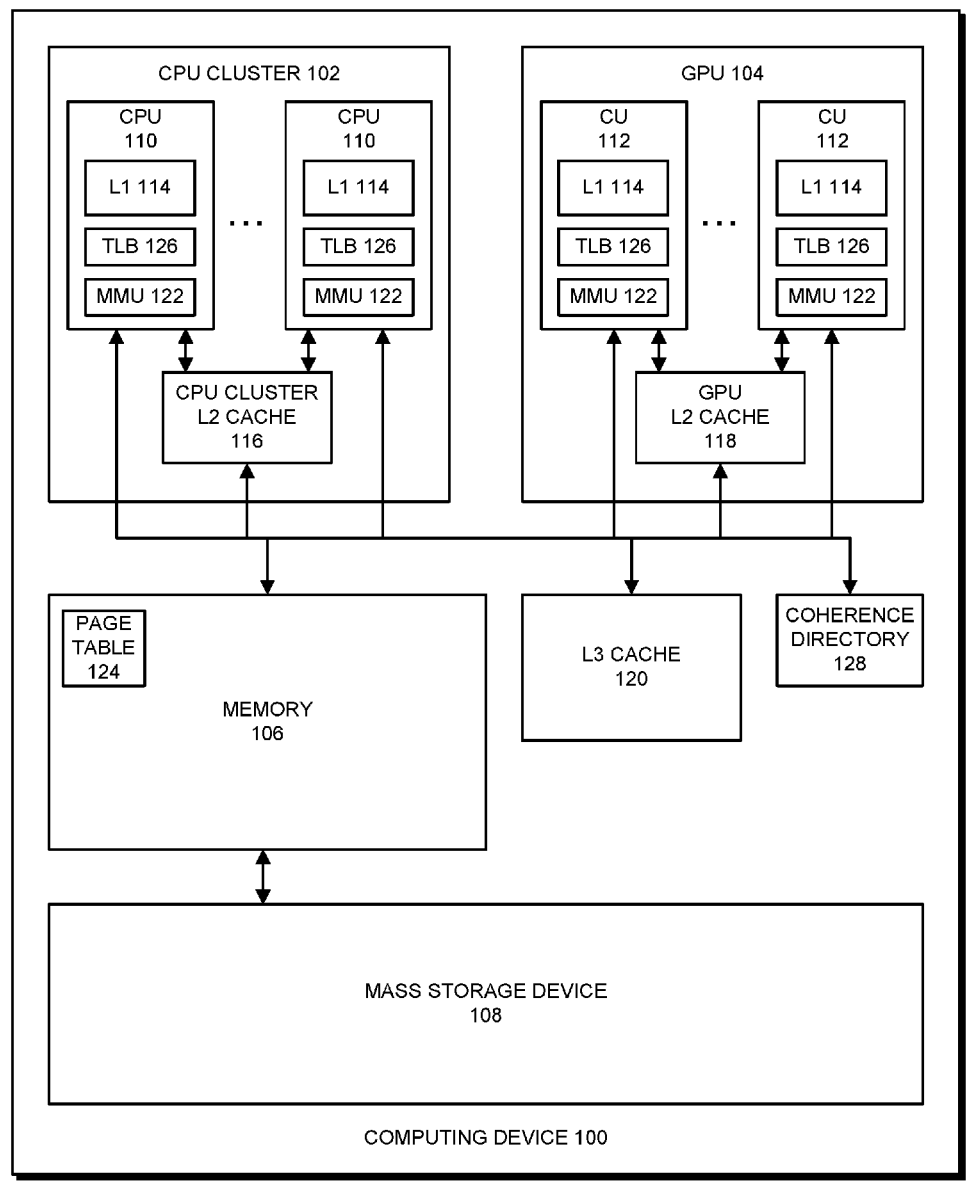
FIG. 1 presents a block diagram illustrating a computing device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Virtual Memory

The described embodiments use a "virtual memory" technique for handling data accesses by programs (e.g., applications, operating systems, device drivers, etc.) being executed in a computing device (e.g., computing device 100 in FIG. 1), by peripherals, and/or by other entities. In the described embodiments, when data is accessed by a program (or a peripheral, another entity, etc.), a block of memory of a given size (e.g., 4 kB, 64 kB, etc.) that includes the data, which is called a "page" of memory, is copied from mass storage (e.g., a disk drive or semiconductor memory) to an available physical location in a memory (e.g., a "main" memory) in the computing device or newly created at an available physical location in the memory (e.g., when a block of memory is created for storing computational results, etc.). In order to avoid programs being required to keep track of the physical locations of pages in memory, in the described embodiments, processors (or other entities, such as memory management units) keep track of the physical locations of the pages for the programs. In these embodiments, programs access memory using "virtual addresses" in "virtual address spaces," which are local address spaces that are specific to corresponding programs, instead of accessing memory using addresses based on the physical locations of pages (or "physical addresses"). From a program's perspective, virtual addresses indicate the actual physical locations where data is stored within the pages in memory and memory accesses are made by programs using the virtual addresses accordingly. The virtual addresses, however, may not map directly to the physical addresses of the physical locations where data is stored in pages in the memory. As part of managing the physical locations of pages, the processors translate the virtual addresses used by the programs in memory access requests into the physical addresses where the data is actually located. The processors than use the physical addresses to perform the memory accesses for the programs.

In order to enable the above-described virtual address to physical address translation, the described embodiments include a "page table." The page table is a record stored in a memory of the computing device that includes an entry, or a "page table entry," with virtual address to physical address translation information for pages that are stored in the memory. Upon receiving a request from a program to access memory at a given virtual address, a processor (or another entity, such as a memory management unit) acquires corresponding physical address information from the page table by performing a "page table walk," during which the page table is searched, possibly entry-by-entry, for a page table entry that provides the physical address associated with the virtual address.

Because page table walks are relatively slow, it is desirable to avoid performing page table walks. The described embodiments therefore include translation lookaside buffers ("TLBs"), which are local caches in, or associated with, each processor that are used by the processor for storing a limited number of copies of information based on page table entries that were acquired during page table walks. During operation, processors first attempt to acquire cached page table entry information from the corresponding TLB for performing virtual address to physical address translations. When the page table entry information is not present in the TLB (i.e., when a "miss" occurs), the processors perform a page table walk to acquire the desired page table entry—and may then cache a copy of information from the acquired page table entry in the TLB.

Overview

In the described embodiments, a computing device includes multiple heterogeneous types of processors. For example, the computing device may include one or more central processing units (CPUs), one or more graphics processing units (GPUs), one or more media processors, etc. The processors are "heterogeneous" in that each of the processors has at least some different capabilities or features, processing circuits, power consumption, performance levels, monetary costs, and/or other characteristics. The computing device also includes a memory that is shared among the processors. For example, some or all of a "main memory" of the computing device may be shared by, and therefore accessed by, any of the processors.

In the described embodiments, processors can acquire copies of data from the shared memory and store the copies of the data in local caches for the processors (or "cache" the data). The processors may then modify (i.e., overwrite, update, or otherwise change) the cached copy of the data. To avoid incoherency/inconsistency between cached copies of data held by processors and the corresponding data in the memory and/or copies of the data held in caches by other processors, the described embodiments perform operations to enforce coherency between the copy of the data in the cache and the other copies of the data. Generally, enforcing coherency means ensuring that modifications of copies of data get propagated appropriately to all caches and/or the shared memory in the computing device.

In the described embodiments, the above-described page table is used for performing some of the operations for enforcing coherency. More specifically, each page table entry includes (or is otherwise associated with) a set of metadata, the metadata including a number of fields for holding metadata describing, controlling, attributed to, or otherwise relating to the corresponding page in the memory. In the described embodiments, the metadata includes a cache coherency indicator that indicates a coherency state for the corresponding page in memory. The coherency state in the cache coherency indicator is represented by a value that indicates which types of processors have access to the corresponding page in the memory. For example, in some embodiments, the cache coherency indicator includes a number of bits, a character string, and/or another indicator that can be set to corresponding values to identify the type or types of processor that presently have access to the corresponding page in memory. For instance, assuming an embodiment where the types of processors include at least CPU(s) and GPU(s), the cache coherency indicator can be set to a first value (e.g., "01") to indicate that only CPU(s) have access, set to a second value (e.g., "10") to indicate that only GPU(s) have access, and set to a third value (e.g., "11") to indicate that both CPU(s) and the GPU(s) have access, possibly with other values (e.g., "00") being reserved, used to indicate other properties of the page, and/or used to indicate invalidity, an unknown state, or error, etc.

In the described embodiments, as a page is loaded into memory or newly created in memory for access by a given type of processor (e.g., a CPU), an operating system (or other software entity) adds a corresponding page table entry to the page table. When adding the entry, the operating system sets, in the metadata for the page table entry, the cache coherency indicator to indicate that the given type of processor has access to the page. For instance, using the example above, the cache coherency indicator may be set to 10 when a CPU, but not a GPU, has access to the page in the memory.

In the described embodiments, when a processor among the types of processors (e.g., a CPU, a GPU, etc.) is to access data in the page in memory, the processor (e.g., a memory management unit in the processor) acquires the metadata from the page table entry (i.e., along with acquiring virtual address to physical address translation information during a page table walk or from a TLB entry) and checks the cache coherency indicator to determine if the type of processor indicated by the cache coherency indicator is a same type of processor as the processor. When the cache coherency indicator indicates a different type of processor, the processor is prevented from accessing the data in the page of memory. For instance, using the example above, if the cache coherency indicator is set to 10 for a CPU, and the processor is a GPU, the processor is prevented from accessing data in the page in the memory. When "preventing access," the described embodiments prevent the processor from acquiring and/or caching copies of the data from the page, reading the data from or writing data to the page, etc. By preventing access as described, the described embodiments ensure that only processors of a type specified by the cache coherency indicator are allowed access to data from the page in the memory. It is therefore known that none of the other types of processors hold, in local caches (i.e., within a local cache hierarchy for the other types of processors), copies of the data (in any state—original, shared, modified, etc.). Note that, as described herein, a processor that is initially "prevented" from accessing data in the page of memory may subsequently perform one or more operations to enable accessing the data in the page of memory. The prevention of accesses for processors for data in pages of memory may therefore be temporary (i.e., may only persist until one or more access-enabling operations are performed).

In contrast to the above-described case, when the cache coherency indicator indicates a same type of processor (e.g., the particular processor is a CPU and the cache coherency indicator indicates a CPU), the processor can access the data from the page in memory (i.e., acquire and cache the data from the page in memory) without performing a coherency operation with other types of processors in the computing device. For example, in some embodiments, the processor does not perform a coherence directory lookup (i.e., the coherency operation) for data in the page in the memory when checking various caches to determine if a copy of the data is held therein (as would be performed in existing processors). In these embodiments, when accessing data in the page of memory, the processor (e.g., a CPU) may first check the local cache hierarchy and, upon finding that the data is not cached locally, may proceed to checking a remote cache (e.g., an L3 cache) and/or the memory for the data—without first communicating with a hardware coherence directory to determine whether the data is cached in a local cache hierarchy for other types of processor (e.g., GPUs). This is possible because, as described above, other types of processors are prevented from accessing the data in the page of memory based on the state of the cache coherency indicator and there is therefore no need to perform the check to determine whether the data is cached in local cache hierarchies for the other types of processor.

In the described embodiments, upon finding that the cache coherency indicator in the metadata of a page table entry for a page in the memory indicates another type of processor, a processor of a given type can switch (i.e., change) the cache coherency indicator to indicate the type of the processor of the given type. For example, a GPU may switch the cache coherency indicator from indicating CPU to indicating GPU. More specifically, in some embodiments, upon finding that the cache coherency indicator indicates another type of processor, a memory management unit in the processor can signal a permission fault to an operating system in the processor. The operating system (or another hardware or software entity) can then cause processors of other types to invalidate cached copies of data from the page in the memory (which may include returning modified or "dirty" copies of data to the memory, updating coherency state for corresponding cache entries, etc.) and invalidate copies of information from the corresponding page table entry held in TLBs (e.g., by performing a TLB shootdown). By doing this, the operating system ensures that no data and/or incorrect copies of page table entries (with outdated metadata) are held by processors of other types. The operating system then switches the cache coherency indicator in the metadata for the page in memory to indicate the type of the processor of the given type. As described above, when the cache coherency indicator indicates the same type of processor as the processor of the given type, the processor of the given type can access data in the page in memory without performing a coherency operation (i.e., without performing a hardware directory check for the data).

In some embodiments, the cache coherency indicator can be set to indicate that two or more (and possibly all available) types of processor have access to data in a corresponding page in the memory. In these embodiments, unlike the above-described cases (in which only a single type of processor has access to the page in memory), two or more of the types of processors in the computing device may acquire copies of data from the page, cache copies of data, etc. In these embodiments, when a given processor (possibly regardless of the type of processor) attempts to access a page in the memory and finds that the corresponding cache coherency indicator is set to indicate two or more types of processors, the given processor will perform a coherency operation (i.e., perform a hardware directory check for the data, if necessary, when checking various caches for cached copies of the data).

In some embodiments, setting the cache coherency indicator to indicate that two or more (and possibly all available) types of processor as described above is done based on one or more runtime factors, rules, policies, etc. For example, when a page in memory is determined to be actively shared between two or more types of processors, the cache coherency indicator can be set to indicate the two or more types of processor have access to the page in memory.

By determining cache coherency information for pages in the memory using metadata from a corresponding page table entry, the cache coherency information can be acquired during an existing virtual address to physical address translation process. Corresponding coherence directory lookups (i.e., the coherency operation) can therefore be avoided with only a small change to the contents of the page table and the virtual address to physical address translation process. Avoiding coherence directory lookups can reduce the number of communications on a system bus, reduce power consumption, reduce the number of computational operations performed by the coherence directory, avoid delay, etc. This can, in turn, enable the computing device to operate more efficiently.

Computing Device

FIG. 1 presents a block diagram illustrating a computing device 100 in accordance with some embodiments. As can be seen in FIG. 1, computing device 100 includes central processing unit (CPU) cluster 102, graphics processing unit (GPU) 104, memory 106, and mass storage device 108. CPU cluster 102 includes a number of CPUs 110 that perform computational operations in computing device 100. For example, each CPU may be a microprocessor core, an embedded processor, etc. and may include general-purpose processing circuits for performing computational operations.

GPU 104 includes a number of compute units (CU) 112 that perform computational operations in computing device 100. For example, each CU 112 may be a graphics processing compute unit and may include general-purpose processing circuits for performing computational operations.

In some embodiments, CPUs 110 and CUs 112 are heterogeneous, in that the processing circuits and/or other circuits in CPUs 110 and CUs 112 have different capabilities or features, circuit structures, power consumption, performance levels, and/or other characteristics. For example, in some embodiments, CPUs 110 include processing circuits configured to perform general processing operations, and CUs 112 include processing circuits that are optimized for parallel processing of data, including graphics data (e.g., pixel processing, etc.) and/or other types of data. Note, however, that in some embodiments, despite being heterogeneous, CPUs 110 and CU 112 may be able to perform some or all of the same operations, albeit less efficiently, while consuming more electrical power, while taking a longer time, etc.

Memory 106 is the "main memory" of computing device 100, and includes computer-readable memory circuits such as one or more of dynamic random access memory (DRAM), double data rate synchronous DRAM (DDR SDRAM), non-volatile random access memory (NVRAM), phase change memory, memristors, and/or other types of memory circuits for storing data and instructions for use by functional blocks in computing device 100, as well as control circuits for handling accesses of the data and instructions that are stored in the memory circuits.

Mass storage device 108 is a mass-storage device that stores data and instructions for use in computing device 100. Mass storage device 108 includes a high-capacity non-volatile semiconductor memory (a flash memory, an NVRAM, etc.), a disk drive (hard drive, etc.), an optical drive, and/or another storage device. In some embodiments, mass storage device 108 has significantly more storage space than memory 106.

Computing device 100 includes various cache memories (or "caches") that are used for locally storing copies of data and instructions that are used by CPUs 110 and CUs 112 for performing computational operations. As can be seen in FIG. 1, the caches in computing device 100 include a level-one (L1) cache 114 ("L1 114") in each CPU 110 and CU 112. Each L1 cache 114 includes memory circuits such as one or more of static random access memory (SRAM), DRAM, DDR SDRAM, and/or other types of memory circuits for storing (i.e., locally caching) copies of data and instructions for use by the corresponding CPU 110 or CU 112, as well as control circuits for handling accesses of the data and instructions that are stored in the memory circuits. In some embodiments, the L1 caches 114 are the smallest of the caches in computing device 100 (in terms of the capacity of the memory circuits) and are located closest to the functional blocks (e.g., execution units, instruction fetch units, etc.) that use the data and instructions in the corresponding CPU 110 or CU 112.

The caches in computing device 100 also include a shared level-two (L2) cache in each of CPU cluster 102 (i.e., CPU cluster L2 cache 116) and GPU 104 (GPU L2 cache 118). Each of CPU cluster L2 cache 116 and GPU L2 cache 118 include memory circuits such as one or more of SRAM, DRAM, DDR SDRAM, and/or other types of memory circuits for storing copies of data and instructions for use by each of the CPUs 110 and the CUs 112, respectively, as well as control circuits for handling accesses of the data and instructions that are stored in the memory circuits. In some embodiments, the L2 caches are larger than the L1 caches, and are located further than L1 caches from the functional blocks that use the data and instructions.

The caches in computing device 100 further include a shared level-three (L3) cache 120 that includes memory circuits such as one or more of SRAM, DRAM, DDR SDRAM, and/or other types of memory circuits for storing copies of data and instructions for use by CPU cluster 102 (i.e., by the CPUs 110, etc.) and GPU 104 (i.e., by the CUs 112, etc.), as well as control circuits for handling accesses of the data and instructions that are stored in the memory circuits. In some embodiments, L3 cache 120 is the largest of the caches in computing device 100, and is located the furthest from the functional blocks that use the data and instructions (relative to the L1 and L2 caches).

In some embodiments, at least some of the caches in computing device 100 are considered to belong to "cache hierarchies," with each cache hierarchy including caches that are local to corresponding processors (which are interchangeably called "local cache hierarchies" in which data is "cached locally"). For example, for CPUs 110, the associated L1 caches 114 and CPU cluster L2 cache 116 are part of the local cache hierarchy, while the caches in GPU 104 are not, and L3 cache is a remote cache that is not part of a local cache hierarchy. In some embodiments, data stored in caches in a corresponding cache hierarchy is accessed without communicating with coherence directory 128. For example, when accessing data, a given CPU 110 or CU 112 may first check the corresponding/local cache hierarchy to determine if the data is stored in a local cache, and may then proceed to perform a lookup in coherence directory 128 when the data is not found to be cached locally (depending on the state of corresponding cache coherency indicators, as described herein).

In the described embodiments, during memory access requests, when data (which may be actual data, instructions, control values, etc.) is not present in the caches or memory 106, the corresponding CPU 110 or CU 112 acquires the data from mass storage device 108. More specifically, the CPU 110 or CU 112 obtains a copy of the data from mass storage device 108 and stores the data into memory 106 for subsequent use by functional blocks in computing device 100. In some embodiments, data and instructions are retrieved from mass storage device 108 in blocks of a given size (e.g., 4 kB, 8 kB, etc.), which are called "pages," and the pages are stored in memory 106 in preparation for accesses by CPUs 110 and/or CUs 112. In some embodiments, at least some of the pages (again, blocks of a given size) are not copied from mass storage device 108 to memory 106, but instead are created (e.g., allocated, generated, reserved, etc.) in memory 106 during and/or for computational operations. For example, a new page may be created in memory 106 by a CPU 110 or CU 112 to store data generated during computational operations, for storing intermediate data (which may not ever be copied to mass storage device 108), for storing data generated by another source in computing device 100 to be used during computational operations, and/or for storing other generated or acquired data.

As described above, in the described embodiments, computing device 100 uses virtual memory to enable software programs (e.g., executed by CPUs 110 and/or CUs 112) to access memory without managing the physical locations of pages in memory 106. In these embodiments, upon receiving a memory access request from a program with a virtual address, a corresponding memory management unit 122 ("MMU 122") performs operations for translating the virtual address into the physical address for the pages where data is located in memory 106. In some embodiments, memory management unit 122 uses two mechanisms for performing virtual address to physical address translations, page table 124 and translation lookaside buffers 126 ("TLBs 126").

Page table 124 is a data structure (e.g., a table, an array, a list, etc.) that is stored in memory 106. In some embodiments, page table 124 stores at least one translation for each page present in memory 106. Thus, in these embodiments, if a page has been copied from mass storage device 108 to memory 106 or otherwise created in memory 106 and remains available in memory 106, a corresponding virtual address to physical address translation should exist in page table 124. Upon receiving a memory access request from a program with a virtual address, a memory management unit 122 searches page table 124 (or performs a "page table walk") to acquire the physical address for the virtual address. Page table 124 is described in more detail below.

Translation lookaside buffers 126 are caches in CPUs 110 and CUs 112 that are configured to store/cache virtual address to physical address translation information acquired during page table walks of page table 124. CPUs 110 and CUs 112 (i.e., the corresponding memory management unit 122) acquire virtual address to physical address translation information from the corresponding TLB 126 when possible to avoid performing a page table walk. TLBs 126 are described in more detail below.

Coherence directory 128 is a functional block that performs operations for enforcing coherency between the caches (L1 caches 114, L2 caches 116 and 118, and L3 cache 120) and memory 106. In some embodiments, coherence directory 128 includes various circuits and/or other hardware that maintain records of cache blocks (e.g., cache lines of a given size) that are stored in caches in computing device 100. In other words, when a copy of data from memory 106 is stored or otherwise changed in a given cache, a corresponding record is added or updated in coherence directory 128. In these embodiments, the records maintained by coherence directory 128 may include an identifiers for cache blocks, the coherence state in which the cache blocks are held (e.g., one of the well-known MESI or MOESI coherence states), the number or identifiers of caches that hold copies of the cache blocks, and/or other information for enforcing coherency. As described herein, depending on the state of the cache coherency indicator, a corresponding CPU 110 or CU 112 may (or may not) perform a lookup in coherence directory 128 to ascertain whether corresponding data is cached is cached in a remote cache hierarchy. For example, based on the state of the cache coherency indicator, a memory management unit 122 in a CPU 110 may (or may not) signal a permission fault to an operating system in CPU 110 that causes the operating system (and/or another hardware or software entity), while searching various caches for the data, to perform a lookup in coherency directory 128 to determine if corresponding data is cached in a cache hierarchy in GPU 104.

In some embodiments, communication paths (that include one or more busses, wires, guides, and/or other connections) are coupled between the various functional blocks in computing device 100 (CPUs 110 and CUs 112, memory 106, etc.), as shown by arrow-headed lines between the elements. The communication paths are used to transmit commands, data, control signals, and/or other information between the functional blocks. Note that the communication paths shown in FIG. 1 are merely exemplary, and may be differently coupled in some embodiments. Generally, the described embodiments include sufficient communication paths to perform the operations herein described.

Although embodiments are described with a particular arrangement of CPUs 110 and CUs 112, some embodiments include a different number and/or arrangement of CPUs 110 and CUs 112 (as shown by the ellipses in FIG. 1). For example, some embodiments have only one CPU 110 and/or CU 112, while other embodiments have two, five, eight, or another number of CPUs 110 and/or CUs 112. Generally, the described embodiments can use any arrangement of CPUs 110 and CUs 112 that can perform the operations herein described.

Although computing device 100 is illustrated with two particular types of processors (i.e., CPUs 110 and CUs 112), in some embodiments, any two or more types of processors may be included in computing device 100. In other words, along with or instead of CPU(s) and/or GPU(s), computing device 100 may include embedded processors, media processors, network processors, controllers, low-power processors, etc. For example, in some embodiments, computing device 100 includes CPU(s) and network processors, but does not include a GPU (e.g., a CPU performs graphics processing functions) or includes a GPU that does not share memory with other types of processors. As another example, in some embodiments, computing device 100 includes CPU(s), GPU(s), and media processor(s). Generally, the described embodiments can use any arrangement of two or more types of processors with local cache hierarchies that share access to data in page(s) in memory 106 and/or that may perform (or avoid performing, as described herein) coherency operations.

Although embodiments are described with a particular arrangement of caches, some embodiments include a different number and/or arrangement of caches. For example, some or all of the caches (e.g., L1 cache 114, etc.) may be divided into separate instruction and data caches. Additionally, L2 caches 116 and 118 may not be shared, and hence may only be used by a single CPU 110 or CU 112 (i.e., there may be an L2 cache for each CPU 110 and/or CU 112). As another example, some embodiments include different levels of caches, from only one level of cache to multiple levels of caches, and these caches may be located internally or externally to CPU cluster 102 or GPU 104. Generally, the described embodiments can use any arrangement of caches that can perform the operations herein described.

Although embodiments are described for which computing device has a number of memory management units 122, some embodiments have a different number and/or arrangement of memory management units. For example, in some embodiments, a single memory management unit 122 is used in GPU 104 (i.e., is shared among the CUs 112). Generally, the described embodiments include sufficient memory management units to perform the operations herein described.

Although a particular arrangement of TLBs is shown in FIG. 1, in some embodiments a different arrangement of TLBs is used in computing device 100. For example, in some embodiments, separate data and instruction TLBs are used in computing device 100. As another example, in some embodiments, a hierarchy of TLBs is used, the hierarchy including two or more levels of TLB with corresponding access times and sizes (i.e., number of entries). Generally, the described embodiments include sufficient TLBs to perform the operations herein described.

Although computing device 100, CPU cluster 102, and GPU 104 are simplified for illustrative purposes in FIG. 1, in some embodiments, computing device 100, CPU cluster 102, and/or GPU 104 include additional mechanisms for performing the operations herein described and other operations. For example, computing device 100 may include power subsystems (i.e., batteries, A/C power units, etc.), media processors, logic units, input-output mechanisms, communication mechanisms, networking mechanisms, display mechanisms, etc.

Computing device 100 can be or can be included in any electronic device that performs computational operations. For example, computing device 100 can be or can be included in electronic devices such as desktop computers, laptop computers, wearable computing devices, tablet computers, smart phones, servers, network appliances, toys, audio-visual equipment, home appliances, controllers, vehicles, etc., and/or combinations thereof.

Page Table

Figure 2:
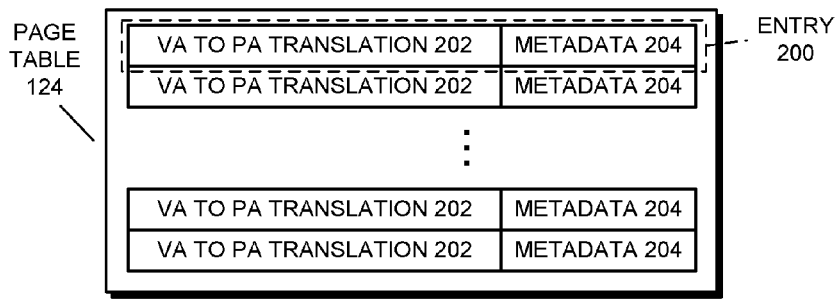
FIG. 2 presents a block diagram illustrating a page table in accordance with some embodiments.

As described above, computing device 100 uses page table 124 for performing virtual address to physical address translations. FIG. 2 presents a block diagram illustrating page table 124 in accordance with some embodiments. As can be seen in FIG. 2, page table 124 includes a number of entries 200 (an entry 200 is highlighted using a dashed line in FIG. 2), each of which is configured to store a virtual address ("VA") to physical address ("PA") translation 202 along with corresponding metadata 204.

Virtual address to physical address translation 202 indicates a physical location (e.g., starting address in memory 106) of a page (i.e., a block of data of a given size, such as 4 kB, 8 kB, etc.) in memory where data associated with one or more virtual addresses is located. For example, in some embodiments, each virtual address to physical address translation 202 includes a first field with some or all of one or more virtual addresses and a second field with some or all of a physical address to which the one or more virtual addresses map/match. For instance, in some embodiments, the first field in each virtual address to physical address translation 202 includes a subset of the bits (e.g., an upper 40, 36, etc. bits) of a virtual address and the second field includes a subset of the bits of a corresponding physical address. In some embodiments, as pages are retrieved from mass storage device 108 and stored in memory 106 and/or newly created in memory 106, corresponding entries 200 are added to page table 124 with virtual address to physical address translations 202. Thus, if a page has been copied from mass storage device 108 to memory 106 or newly created in memory 106 (and remains available in memory 106), a corresponding virtual address to physical address translation 202 should exist in page table 124.

Figure 3:
FIG. 3 presents a block diagram illustrating metadata in a page table entry accordance with some embodiments.

Metadata 204 includes information associated with, characterizing, controlling, attributed to, and/or otherwise relevant to the corresponding virtual address to physical address translation 202. When a virtual address to physical address translation 202 is added to page table 124, metadata is acquired, generated, etc. and added to a corresponding entry 200 as metadata 204. FIG. 3 presents a block diagram illustrating metadata 204 in accordance with some embodiments. As can be seen in FIG. 3, metadata 204 includes validity field 300, which includes one or more values that relate to the validity of the corresponding virtual address to physical address translation 202 and/or the corresponding page in memory 106. For example, validity field 300 may include one or more bits indicating whether the corresponding page in memory 106 is valid/accessible and/or whether the entry 200 itself is valid/accessible.

Metadata 204 also includes permissions field 302, which includes one or more values that relate to access permissions for the corresponding page in memory 106. For example, metadata 204 may include one or more bits that indicate whether the corresponding page in memory 106 has read-only or read-write permissions set, whether the page is only accessible with particular privileges (administrator, user, kernel, etc), and/or other permissions information.

Metadata 204 also includes control field 304, which includes one or more values that relate to the use of the entry 200 and/or the corresponding page in memory 106. For example, control field 304 may include a page size indicator, a dirty indicator (for when the corresponding page in memory 106 has been modified and is therefore inconsistent with the associated block of memory on mass storage device 108), an accessed indicator (for when the page in memory 106 has been accessed one or more times), a write-through indicator (for when modifications to the page in memory 106 are to be reflected immediately in the associated block of memory on mass storage device 108), and/or other values.

Metadata 204 also includes cache coherency indicator 306, which includes one or more values that indicate a coherency state or scope of the corresponding page in memory 106. For example, cache coherency indicator 306 may include one or more bits, one or more character strings, and/or other values that indicate a first coherency state in which access to the corresponding page in memory 106 is restricted to CPUs 110 and/or CUs 112. In some embodiments, cache coherency indicator 306 is set to a given value when the corresponding entry 200 is added to page table 124 and can be switched/updated dynamically based on one or more runtime conditions. Cache coherency indicator 306 and the use of cache coherency indicator 306 are described in more detail below.

As described above, when attempting to acquire physical address information for a specified virtual address, a memory management unit 122 (or another entity in computing device 100) may perform a page table walk. During the page table walk, the memory management unit 122 uses a corresponding search technique, such as a sequential or entry-by-entry check, to search page table 124 in memory 106 to find an entry 200, should such an entry 200 exist, in which a corresponding virtual address to physical address translation 202 is held. Upon encountering such an entry 200, the memory management unit 122 acquires, from the entry 200, the physical address for the specified virtual address (i.e., from the virtual address to physical address translation 202 in the entry 200), as well as some or all of the metadata 204 (e.g., cache coherency indicator 306, etc.). If memory management unit 122 is unable to find an entry 200 with the corresponding virtual address to physical address translation, an error-handling operation is performed (e.g., a page fault is emitted and subsequently processed, etc.).

Note that, as described above, the page table walk is augmented to include acquiring cache coherency information, which is information that is not acquired during page table walks and/or present in page table entries for existing computing devices. The benefit of acquiring the cache coherency information during the page table walk is that directory lookups (i.e., a coherency operation) for data in the corresponding page in memory 106 may be avoided by using the cache coherency information, as described herein.

Although page table 124 is shown with a particular number of entries 200, some embodiments include a different number of entries 200 (as shown by the ellipsis in FIG. 2). In addition, although entry 200 and metadata 204 are shown with particular arrangements and types of information, in some embodiments, one or both of entry 200 and metadata 204 includes different information. For example, in some embodiments, at least some of the above-described metadata is stored in a location other than in an entry 200.

For instance, in some embodiments, a separate in-memory data structure is used for storing at least some of the metadata. Generally, page table 124 includes sufficient information to enable computing device 100 to store and retrieve virtual address to physical address translation information and determine coherency states as described herein.

Translation Lookaside Buffer

Figure 4:
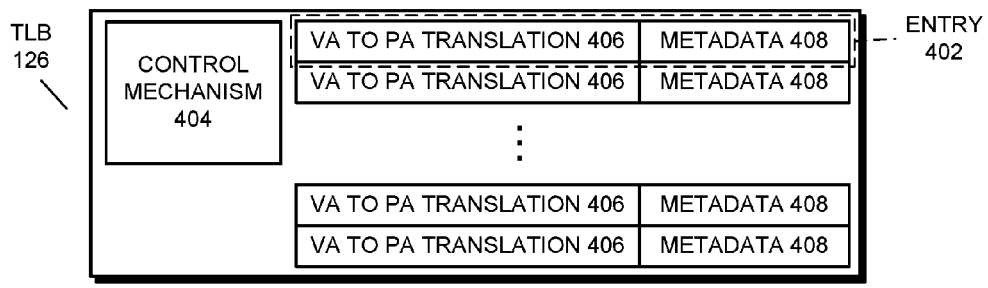
FIG. 4 presents a block diagram illustrating a translation lookaside buffer (TLB) in accordance with some embodiments.

As described above, computing device 100 includes TLBs 126 in CPUs 110 and CUs 112. Each TLB 126 is a cache that is configured to store virtual address to physical address translation information and metadata acquired during page table walks of page table 124 for access by the corresponding CPU 110 or CU 112, memory management unit 122, etc. FIG. 4 presents a block diagram illustrating a TLB 126 in accordance with some embodiments.

As shown in FIG. 4, TLB 126 includes control mechanism 404 and a number of entries 402 (an entry 402 is highlighted using a dashed line in FIG. 4), each of which is configured to store a virtual address ("VA") to physical address ("PA") translation 406 along with corresponding metadata 408.

Virtual address to physical address translation 406 indicates a physical location (e.g., a starting address in memory 106) of the page in memory 106 where data associated with one or more virtual addresses is located. For example, in some embodiments, each virtual address to physical address translation 406 includes a first field with some or all of one or more virtual addresses and a second field with some or all of a physical address in memory 106 to which the one or more virtual addresses map/match. In some embodiments, when virtual address to physical address translations 202 and corresponding metadata 204 are acquired from page table 124 (i.e., during page table walks), virtual address to physical address translation 406 and metadata 408 are updated in entries 402.

Metadata 408 includes information associated with, characterizing, controlling, and/or otherwise relevant to the corresponding virtual address to physical address translation 406. In some embodiments, as virtual address to physical address translation 406 is acquired during a page table walk, metadata is acquired, generated, etc. and added to a corresponding entry 402 (or stored elsewhere in TLB 126).

Figure 5:
FIG. 5 presents a block diagram illustrating metadata in a TLB entry accordance with some embodiments.

FIG. 5 presents a block diagram illustrating metadata 408 in accordance with some embodiments. As can be seen in FIG. 5, metadata 408 includes validity field 500, permissions field 502, control field 504, and cache coherency indicator 506. In some embodiments, validity field 500, permissions field 502, control field 504, and cache coherency indicator 506 include information copied from and/or based at least in part on validity field 300, permissions field 302, control field 304, and cache coherency indicator 306. The description of these values is therefore not repeated here for the sake of brevity. Note, however, that, in some embodiments, some or all of the information in metadata 408 (e.g., control information, validity information, etc.) is associated with, related to, or otherwise relevant to the entry 402 in TLB 126. For example, validity field 500 may include information about the validity of the corresponding entry 402 in TLB 126, as well as information about the validity of the associated page table entry.

Returning to FIG. 4, control mechanism 404 is a functional block that is configured to perform various operations for acquiring, using, and managing information in entries 402. For example, control mechanism 404 may store virtual address to physical address translation information in entries 402, use the information in entries 402 to perform virtual address to physical address translations, determine coherency values and/or other metadata values (i.e., page attributes), etc.

In some embodiments, the virtual address to physical address translation information is copied directly from the corresponding page table entry, but in other embodiments, one or more operations (e.g., reductions, reformatting, hashing, etc.) is performed before virtual address to physical address translation information from a page table entry is stored in virtual address to physical address translation 406. For example, in some embodiments, TLB 126 includes a multi-level lookup mechanism (not shown) in which virtual address to physical address translation 406 is stored, and the virtual address to physical address translation information from page table 124 is divided into portions to be stored in each level of the multi-level lookup mechanism.

In some embodiments, because the number of entries 402 in TLB 126 is limited, updating an entry 402 in TLB 126 may involve overwriting existing information in an entry 402. For example, when specified entries 402 in TLB 126 (e.g., all, a particular subset of, etc.) hold virtual address to physical address translations, a next virtual address to physical address translation to be written to TLB 126 will overwrite an existing virtual address to physical address translation in an entry 402. In these embodiments, a policy such as first-in-first-out, least recently used, most often used, etc. may be used to determine which entry 402 is to be overwritten. In addition, in some embodiments, the entries in TLB 126 are managed using a particular type of associativity, such as direct mapping, set associativity, skewed associativity, etc. In other words, in some embodiments, TLB 126, which is a cache, may be managed using various replacement techniques.

During operation, when a memory management unit 122 (and/or another hardware or software entity in computing device 100) is to translate a virtual address into a physical address, the memory management unit 122 sends a request that includes some or all of the virtual address to control mechanism 404 in TLB 126. Control mechanism 404 then uses a corresponding search technique, such as a sequential or in-order entry-by-entry check, address matching, etc., to find an entry 402, should such an entry 402 exist, in which a corresponding virtual address to physical address translation 406 is held. For example, in some embodiments, TLB 126 includes a content addressable memory in which entries 402 are located, and the control mechanism searches for the virtual address in the content addressable memory. As another example, in some embodiments, TLB 126 includes a table, a directory, and/or another data structure in which entries 402 are located, and the control mechanism performs a corresponding search in the table, directory, and/or other data structure. Upon encountering an entry 402 with the corresponding virtual address to physical address translation 406, control mechanism 404 acquires, from the entry 402, the physical address for the specified virtual address (i.e., from the virtual address to physical address translation 406) and returns the physical address translation to memory management unit 122. If there is no entry 402 in TLB 126 with the virtual address to physical address translation, the search for the virtual address to physical address translation "misses" in the TLB 126 and control mechanism 404 signals a miss to memory management unit 122. Memory management unit 122 then commences a page table walk to acquire the virtual address to physical address translation.

In addition, in some embodiments, a memory management unit 122 uses the virtual address to acquire (e.g., during the above-described search process for the virtual address to physical address translation 406) a cache coherency indicator 306 from the corresponding entry 402, (should such an entry exist in TLB 126). The memory management unit 122 then determines if the cache coherency indicator indicates a same type of processor as the processor associated with memory management unit 122 and performs subsequent operations based on the determination, as described herein.

Note that, as described above, the TLB lookup is augmented to include acquiring cache coherency information, which is information that is not acquired during TLB lookups and/or present in TLB entries for existing computing devices. The benefit of acquiring the cache coherency information during the TLB lookup is that directory lookups (i.e., a coherency operation) for data in the corresponding page in memory 106 may be avoided by using the cache coherency information, as described herein.

Although TLB 126 is shown with a particular arrangement of functional blocks, in some embodiments, TLB 126 is arranged differently. For example, in some embodiments, TLB 126 is configured with functional elements (a directory, one or more tables, etc.) for performing a multi-level search for virtual address to physical address translation information. Generally, the described embodiments can use any internal arrangement of TLB 126 in which the above-described cache coherency indicators 306 are associated with corresponding virtual address to physical address translations. Also, although TLB 126 is shown with a particular number of entries 402, some embodiments include a different number of entries 402 (as shown by the ellipsis in FIG. 4). Additionally, although entries 402 and metadata 408 are shown with particular arrangements and types of information, in some embodiments, one or both of entries 402 and metadata 408 includes more or different information. For example, some or all of metadata 408 may be stored in another location in TLB 126, such as a metadata record data structure (not shown). Generally, TLB 126 includes sufficient information to enable computing device 100 to perform the operations herein described.

Setting a Cache Coherency Indicator for a Single Type of Processor

FIG. 6 presents a flowchart illustrating a process for setting a cache coherency indicator in an entry in a page table in accordance with some embodiments. Note that the operations shown in FIG. 6 are presented as a general example of operations performed by some embodiments. The operations performed by other embodiments include different operations and/or operations that are performed in a different order. Additionally, although certain mechanisms are used in describing the operations (e.g., memory management unit 122, CPU 110, etc.), in some embodiments, other mechanisms may perform the operations. For example, although a CPU used in describing FIG. 6, in some embodiments, a GPU (or another type of processor, such as a media processor, an embedded processor, a network processor, etc.) can perform similar operations.

For the example in FIG. 6, it is assumed that a page of data (recalling that pages are blocks of data of a specified size, each of which includes data for a corresponding number of addresses), which is to be accessed by a first type of processor (i.e., a CPU 110), has not yet been retrieved from mass storage device 108 and stored in memory 106. For this reason, there is not yet a page table entry 200 that includes a corresponding virtual address to physical address translation in page table 124, nor is there a corresponding entry 402 in a TLB 126 for the first type of processor.

Note that, for the example in FIG. 6, it is assumed that the page of data is to be retrieved from mass storage device 108 (i.e., the page of data exists and is stored in mass storage device 108). This may not always be the case. For example, in some embodiments, the page of data is newly created in memory 106. When the page is to be newly created, the operations in FIG. 6 are similar to those shown, with the exception of operation 602. When a page is to be newly created in memory 106, operation 602 may be skipped and/or replaced with an operation for allocating, reserving, etc. the page in memory 106.

The process shown in FIG. 6 starts when a first type of processor receives a request to access data from memory 106 (step 600). For example, the CPU 110 can receive, from an application program, an operating system, etc., a request to read data from or write data to a specified virtual memory address. A memory management unit 122 in the CPU 110 then checks the corresponding TLB 126 and discovers that there is no virtual address to physical address translation in the TLB 126 (i.e., no entry 402 having the virtual address to physical address translation). This "miss" in the TLB 126 causes memory management unit 122 to perform a page table walk, i.e., search page table 124 in an attempt to find an entry 200 with a corresponding virtual address to physical address translation. During the page table walk, memory management unit 122 does not find a page table entry with a virtual address to physical address translation associated with the virtual address. Memory management unit 122 therefore triggers a page fault to cause an operating system for the CPU 110 to retrieve a corresponding page of memory from mass storage device 108 (step 602) and store the page at a location in memory 106 (step 604).

The operating system then adds, to page table 124, an entry 200 with a virtual address to physical address translation 202 for the page in memory 106 (step 606). More specifically, the operating system adds, to the entry, a mapping/association of the physical address/physical location (e.g., starting address in memory 106) of the page in the memory 106 with the virtual address.

The operating system also sets, in metadata 204 for the page table entry 200, cache coherency indicator 306 to indicate the first type of processor (step 608). Continuing the example above, this operation includes setting one or more bits, characters, etc. to indicate a CPU. For example, assuming that there are four bits in the cache coherency indicator and the pattern 0110 indicates a CPU, memory management unit 122 can set the cache coherency indicator to 0110. Note that, during this operation, the operating system may also set some or all of various other values in metadata (e.g., some or all of validity field 300, control field 302, etc.).

In some embodiments, after the above-described setting operation (i.e., step 608) is completed, CPUs 110 and CUs 112 may acquire information from the page table entry 200 (i.e., the virtual address to physical address translation 202 and/or metadata 204) during page table walks (or other operations) and use the information from the page table entry to perform various operations, such as virtual address to physical address translation, determining coherency states for pages, etc. Copies of information from the page table entry 200 may also be stored in local TLBs 126 as described herein.

Controlling Access to Data Using a Cache Coherency Indicator

FIG. 7 presents a flowchart illustrating a process for controlling access to data using a cache coherency indicator in accordance with some embodiments. Note that the operations shown in FIG. 7 are presented as a general example of operations performed by some embodiments. The operations performed by other embodiments include different operations and/or operations that are performed in a different order. Additionally, although certain mechanisms are used in describing the operations (e.g., memory management unit 122, CPU 110, etc.), in some embodiments, other mechanisms may perform the operations. For example, although a CPU used in describing FIG. 7, in some embodiments, a GPU (or another type of processor, such as a media processor, an embedded processor, a network processor, etc.) can perform similar operations.

For the example in FIG. 7, it is assumed that the operations of FIG. 6 have been performed. Thus, a page of data, which is to be accessed by a first type of processor (i.e., a CPU 110), has been retrieved from mass storage device 108 and stored in memory 106 (or has been newly created in memory 106, as described above). In addition, there is a page table entry 200 that includes a corresponding virtual address to physical address translation 202 and metadata 204. The metadata 204 includes a cache coherency indicator 306 that indicates the first type of processor. There may also be a corresponding entry 402 in a TLB 126 for the first type of processor.

The process shown in FIG. 7 starts when a first type of processor receives a request to access data in the page of data in the memory (step 700). For example, the CPU 110 can receive, from an application program, an operating system, etc., a request to read data from or write data to a specified virtual memory address.

A memory management unit 122 in the CPU 110 then determines, based on metadata from a corresponding page table entry, that the cache coherency indicator indicates the first type of processor (step 702). For example, memory management unit 122 can check (i.e., perform a lookup in) the corresponding TLB 126 and acquire, from an entry 402 that has a corresponding virtual address to physical address translation in the TLB 126, the cache coherency indicator 506. Otherwise, when there is no entry in the TLB 126 associated with the virtual address (i.e., when there is a TLB miss), the memory management unit 122 can perform a page table walk to acquire, from an entry 200 in page table 124 that has a corresponding virtual address to physical address translation, the cache coherency indicator 306. The memory management unit 122 can then compare the acquired cache coherency indicator to a record of one or more cache coherency indicators (e.g., a table, one or more values in registers, etc.) to determine a type of processor (in this case, the first type of processor) indicated by the cache coherency indicator. For example, if the character string "CPU" in the cache coherency indicator indicates the first type of processor, the memory management unit 122 can determine that the type of processor is CPU.

In some embodiments, the above-described acquisition of the cache coherency indicator occurs at the same time that the virtual address to physical address translation itself is acquired (i.e., the metadata with the cache coherency indicator is acquired along with the virtual address to physical address translation information). In other words, in these embodiments, the acquisition of the virtual address to physical address translation is augmented with, or extended to, include the acquisition of the cache coherency indicator. For example, the memory management unit 122 may include hardware circuit structures that acquire the cache coherency indicator during the TLB lookup or the page table walk.

By making the determination in step 702, the memory management unit 122 determines that the page in the memory for the virtual address is in a coherency state (or has a coherency scope) in which processors other than the first type of processor (e.g., CUs 112 in GPU 104) are not permitted to access data in the page in memory 106. For this reason, it is known that processors other than the first type of processor will not have copies of data from the page of memory cached in local cache hierarchies. The data may, however, be cached locally in the local cache hierarchy for the CPU 110 (e.g., in L1 caches 114 in other CPUs 110 or in CPU cluster L2 cache 116).

The memory management unit 122 then causes another entity such as an operating system, a hardware or software coherency mechanism, etc. to access the data in the page of memory for the first type of processor without performing a coherency operation for the data with other types of processor (step 704). More specifically, the other entity first checks the corresponding local cache hierarchy to determine if the data is cached locally. In other words, the other entity checks the local L1 cache 114 and then checks, if necessary, CPU cluster L2 cache 116 and/or other CPUs' L1 caches 114. If the data is cached locally, the other entity acquires the data for the CPU 110, if necessary, and causes the CPU 110 to continue subsequent operations. Otherwise, upon finding that the data is not cached locally, the other entity proceeds to check L3 cache 120 (i.e., a remote cache that is not in the local cache hierarchy) and/or memory 106 for the data, without performing a coherency operation (i.e., without performing a lookup in a hardware coherence directory to determine whether the data is cached in a local cache hierarchy for other types of processor (e.g., GPUs)). Recall that this is possible because it is known that other types of processors (e.g., GPUs, etc.) are not allowed to access the page in memory and therefore do not have locally cached copies of data from the page.

Figure 8:
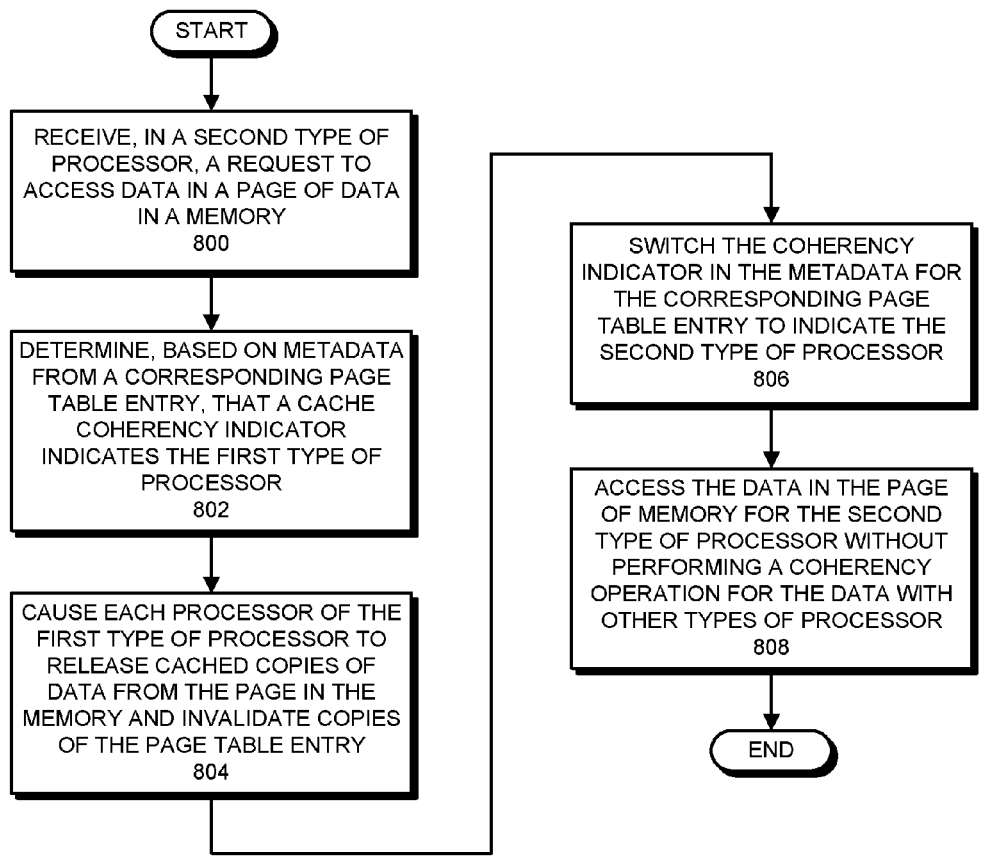
FIG. 8 presents a flowchart illustrating a process for controlling access to data using a cache coherency indicator in accordance with some embodiments.

FIG. 8 presents a flowchart illustrating a process for controlling access to data using the cache coherency indicator in accordance with some embodiments. Note that the operations shown in FIG. 8 are presented as a general example of operations performed by some embodiments. The operations performed by other embodiments include different operations and/or operations that are performed in a different order. Additionally, although certain mechanisms are used in describing the operations (e.g., memory management unit 122, CU 112, etc.), in some embodiments, other mechanisms may perform the operations. For example, although a GPU used in describing FIG. 8, in some embodiments, a CPU (or another type of processor, such as a media processor, an embedded processor, a network processor, etc.) can perform similar operations.

For the example in FIG. 8, it is assumed that the operations of FIG. 6 have been performed. Thus, a page of data, which is to be accessed by a first type of processor (i.e., a CPU 110), has been retrieved from mass storage device 108 and stored in memory 106 (or has been newly created in memory 106, as described above). In addition, there is a page table entry 200 that includes a corresponding virtual address to physical address translation 202 and metadata 204. The metadata 204 includes a cache coherency indicator 306 that indicates the first type of processor. There may also be a corresponding entry 402 in a TLB 126 for the first type of processor.

The process shown in FIG. 8 starts when a second type of processor receives a request to access data in the page of data in the memory (step 800). For example, a CU 112 in GPU 104 can receive, from an application program, an operating system, etc., a request to read data from or write data to a specified virtual memory address.

A memory management unit 122 in CU 112 then determines, based on metadata from a corresponding page table entry, that the cache coherency indicator indicates the first type of processor (step 802). For example, memory management unit 122 can check (i.e., perform a lookup in) the corresponding TLB 126 and acquire, from an entry 402 that has a corresponding virtual address to physical address translation in the TLB 126, the cache coherency indicator 506. Otherwise, when there is no entry in the TLB 126 associated with the virtual address (i.e., when there is a TLB miss), the memory management unit 122 can perform a page table walk to acquire, from an entry 200 in page table 124 that has a corresponding virtual address to physical address translation, the cache coherency indicator 306. The memory management unit 122 can then compare the acquired cache coherency indicator to a record of one or more cache coherency indicators (e.g., a table, one or more values in registers, etc.) to determine a type of processor (in this case, the first type of processor) indicated by the cache coherency indicator. For example, if the character string "CPU" in the cache coherency indicator indicates the first type of processor, the memory management unit 122 can determine that the type of processor is CPU.

By making the above-described determination, the memory management unit 122 determines that the page in the memory for the virtual address is in a coherency state (or has a coherency scope) in which the second type of processor is not permitted to access data in the page in memory 106. Because the second type of processor is requesting to access data in the page in memory 106, however, the memory management unit 122 causes the cache coherency indicator to be updated to indicate the second type of processor. More specifically, in some embodiments, upon finding that the cache coherency indicator indicates the first type of processor, the memory management unit 122 signals a permission fault to an operating system in the CU 112. The operating system (or other software or hardware entity) then causes each processor of the first type to invalidate cached copies of data from the page in the memory (which includes returning modified or "dirty" copies of data to the memory, updating coherency state for corresponding cache entries, etc.) and invalidate copies of information from the corresponding page table entry held in TLBs (by performing a TLB shootdown, etc.) (step 804). By doing this, the operating system (or other entity) ensures that no data and/or incorrect copies of page table entries (with outdated metadata) are held by processors the first type during subsequent operations. This makes possible the assumption about data not being cached in the first type of processor following the switching of the cache coherency indicator in step 806.

The operating system then switches the cache coherency indicator in the metadata for the corresponding page table entry to indicate the second type of processor (step 806). For example, assuming that the pattern 01 represents a CU 112, the operating system can switch the cache coherency indicator to 01 (e.g., from 10, which indicates a CPU 110).

The operating system (or another entity such as a hardware or software coherency mechanism, etc.) then accesses the data in the page of memory for the second type of processor without performing a coherency operation for the data with other types of processor (step 808). (In some embodiments, this may include repeating step 802 to check the coherency indicator after switching the coherency indicator.) More specifically, the operating system (or other entity) first checks the corresponding local cache hierarchy to determine if the data is cached locally. In other words, operating system (or other entity) checks the local L1 cache 114 and then checks, if necessary, GPU L2 cache 118 and/or other CUs' L1 caches 114. If the data is cached locally, operating system (or other entity) acquires the data for CU 112, if necessary, and causes CU 112 to continue subsequent operations. Otherwise, upon finding that the data is not cached locally, operating system (or other entity) proceeds to check L3 cache 120 (i.e., a remote cache that is not in the local cache hierarchy) and/or memory 106 for the data, without performing a coherency operation (i.e., without performing a lookup in a hardware coherence directory to determine whether the data is cached in a local cache hierarchy for other types of processor (e.g., CPUs). Recall that this is possible because it is known that other types of processors (e.g., CPUs, etc.) are not allowed to access the page in memory and earlier released locally cached copies of data from the page (in step 804) and therefore do not have locally cached copies of data from the page.

Setting a Cache Coherency Indicator for Two or More Types of Processors

In the described embodiments, cache coherency indicators can be set to values that indicate that two or more (and possibly all) types of processors have access to data in a page of memory. For example, a three bit cache coherency indicator in computing device 100 may be set to a value of 101 to indicate that the coherency state for the corresponding page in memory is CPU_GPU, in which both CPUs 110 and CUs 112 in GPU 104 may access the page, locally cache copies of data from the page, etc. In these embodiments, because any of the types of processor may have locally cached data, upon encountering such a value in a cache coherency indicator, a memory management unit 122 will, if necessary, cause (e.g., via a permission fault, etc.) another entity such as an operating system, a hardware or software coherency mechanism, etc. to perform a cache coherency operation (i.e., a hardware directory lookup) to determine whether data from the page is locally in the other type of processor. This differs from the cases in FIGS. 7-8, in which only a single type of processor is indicated by a cache coherency indicator in that, for this case, the coherency operation is to be performed due to the possible presence of locally cached data in other types of processors.

In some embodiments, an operating system (or other entity) determines when to set the cache coherency indicator to indicate two or more types of processors based on one or more factors, rules, policies, etc. For example, the operating system may determine (e.g., based on a hint from an application program, runtime condition monitoring, etc.) that data in the page in memory is going to be, or is being, actively shared by two or more types of processors and may set the cache coherency indicator to indicate the two or more types of processors. As another example, the operating system may monitor the above-described switching (in step 806) of the cache coherency indicator and determine that the switching is happening at more than a specified rate (e.g., switching between types of processors more than N times in M milliseconds, etc.), and thus the page in the memory is being actively shared between two or more types of processors, and may set the cache coherency indicator to indicate the two or more types of processors. In these embodiments, the specified rate may be updated dynamically (i.e., at a runtime of computing device 100) based on one or more corresponding conditions. In these embodiments, by setting the cache coherency indicator to indicate two or more types of processors, the above-described switching may be avoided (by preventing subsequent switching between processors of the two or more different types).

Figure 9:
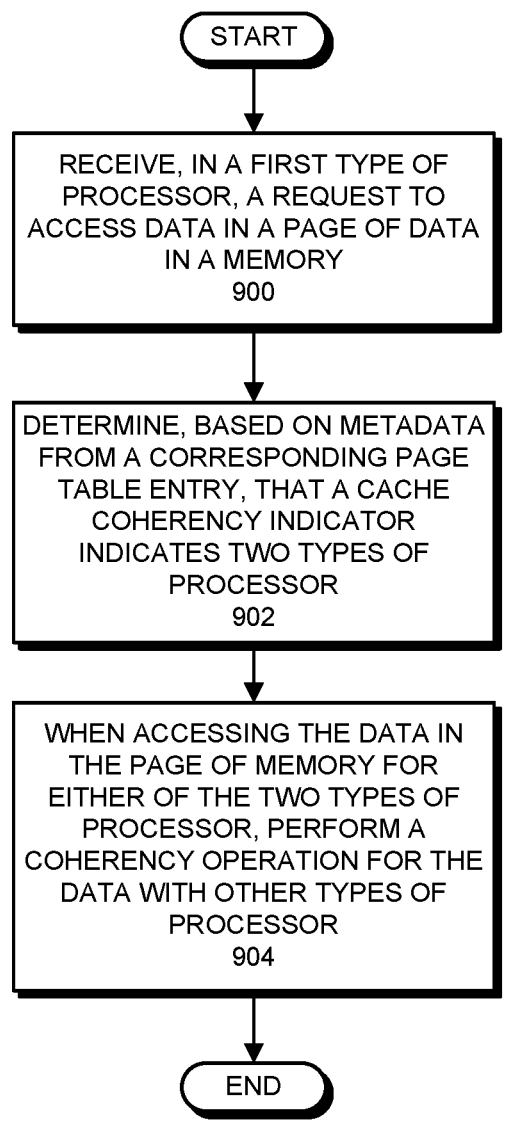
FIG. 9 presents a flowchart illustrating a process for controlling access to data using a cache coherency indicator that indicates two types of processors in accordance with some embodiments.

FIG. 9 presents a flowchart illustrating a process for controlling access to data using a cache coherency indicator that indicates two types of processors in accordance with some embodiments. Note that the operations shown in FIG.

9 are presented as a general example of operations performed by some embodiments. The operations performed by other embodiments include different operations and/or operations that are performed in a different order. Additionally, although certain mechanisms are used in describing the operations (e.g., CPU 110, CU 112 in GPU 104, etc.), in some embodiments, other mechanisms may perform the operations.

For the example in FIG. 9, it is assumed that the operations of FIG. 6 have been performed. Thus, a page of data has been retrieved from mass storage device 108 and stored in memory 106 (or has been newly created in memory 106, as described above). In addition, there is a page table entry 200 that includes a corresponding virtual address to physical address translation 202 and metadata 204. Differently than in FIG. 6, however, for FIG. 9, it is assumed that the cache coherency indicator in the metadata for the page table entry has been set to indicate that two types of processors can access data in the page in memory 106 (i.e., both a first type of processor (e.g., CPU 110) and a second type of processor (e.g., CUs 112) may access the page). As described above, the cache coherency indicator can be set in this way by an operating system based on the page being actively shared, based on a hint from an application program, and/or based on other rules, policies, etc. For simplicity, for the example in FIG. 9, it is assumed that the memory management unit 122 is in a CPU 110, although the operations would be performed similarly for a CU 112 in GPU 104. In addition, although two types of processors are used for the example in FIG. 9, in some embodiments and as described herein, the metadata in the page table may indicate that any number of types of processors that are present in computing device 100 (i.e., three or more) are allowed to access the data in the page in memory 106.

The process shown in FIG. 9 starts when a first type of processor receives a request to access data in the page of data in the memory (step 900). For example, the CPU 110 can receive, from an application program, an operating system, etc., a request to read data from or write data to a specified virtual memory address.

A memory management unit 122 in the CPU 110 then determines, based on metadata from a corresponding page table entry, that the cache coherency indicator indicates two types of processor (i.e., both the first type of processor and a second type of processor) (step 902). For example, memory management unit 122 can check (i.e., perform a lookup in) the corresponding TLB 126 and acquire, from an entry 402 that has a corresponding virtual address to physical address translation in the TLB 126, the cache coherency indicator 506. Otherwise, when there is no entry in the TLB 126 associated with the virtual address (i.e., when there is a TLB miss), the memory management unit 122 can perform a page table walk to acquire, from an entry 200 in page table 124 that has a corresponding virtual address to physical address translation, the cache coherency indicator 306. The memory management unit 122 can then compare the acquired cache coherency indicator to a record of one or more cache coherency indicators (e.g., a table, one or more values in registers, etc.) to determine a type of processor (in this case, the first type of processor) indicated by the cache coherency indicator. For example, if the character string "CPU_GPU" in the cache coherency indicator indicates the two types of processors, the memory management unit 122 can determine that the cache coherency indicator contains the string CPU_GPU.

Note that, by making the above-described determination, the memory management unit 122 determines that the page in the memory for the virtual address is in a coherency state (or has a coherency scope) in which two types of processors (e.g., CPUs 110 and CUs 112) are permitted to access data in the page in memory 106. For this reason, it is unknown whether processors of the second type of processor have copies of data from the page of memory cached in local cache hierarchies. As can be seen in step 904, the memory management unit 122 will therefore perform a coherency operation (i.e., a hardware coherency directory lookup) to determine whether the data is cached in a processor of the second type of processor.

The memory management unit 122 then causes (e.g., via a permission fault, etc.) another entity such as an operating system, a hardware or software coherency mechanism, etc. to perform coherency operation when accessing the data from the page in memory for either of the two types of processor (step 904). More specifically, the other entity first checks the corresponding local cache hierarchy and, upon finding that the data is not cached locally, the other entity performs a hardware coherence directory check to determine if a cached copy of the data is held in a local cache hierarchy for the second type of processor. If so, the data is eventually returned from the second type of processor in response to the coherence directory check (e.g., from a CU 112 and/or GPU 104). Otherwise, when a cached copy of the data is not held in a local cache hierarchy for the second type of processor, the other entity checks a remote cache (e.g., an L3 cache) and/or the memory for the data.

Setting a Temporary or Initial Value in Cache Coherency Indicator

As described above, the described embodiments can set a cache coherency indicator based on the type of processor that is requesting access to data in a corresponding page in memory 106. For example, if a CPU 110 is requesting access to data in a page in memory 106, the operating system for the CPU 110 can set the cache coherency indicator accordingly. In some embodiments, however, the operating system may set the cache coherency indicator to a temporary or initial value that has different meaning than the above-described values for the cache coherency indicator. For example, in some embodiments, it is known (based on a program that is executing, a pattern of past accesses, etc.) that a CPU 110 is requesting access to data in the page of data to initialize the data in the page, but that the CPU 110 will not be caching data from the page in memory 106 before another type of processor operates on the data in the page in memory 106. For instance, the CPU 110 may initialize data in the page that is subsequently to be processed by a CU 112 in GPU 104. In this case, the operating system sets the value in the cache coherency indicator to an initial or "CPU_init" value. For example, assuming an embodiment where the cache coherency indicator is a three bit value, a value such as 101 may be used for the CPU_init value.

In some embodiments, upon encountering the temporary or initial value in a cache coherency indicator, an accessing memory management unit 122 (and/or another entity) may switch the cache coherency indicator as described in step 806 without performing some of operations described in step 804. For example, when the above-described CPU_init value is used, an operating system in a CU 112 may not cause processors of the other type to invalidate cached copies of data from the page in the memory as described for step 804. This is possible because the operating system has been informed, via the CPU_init value, that the CPU 110 will not have data from the page in memory 106 cached locally. By using the temporary or initial value as described, the described embodiments can avoid performing some operations relating to switching the value of the cache coherency indicator.

Cache Coherency Indicator State Diagram

Figure 10:
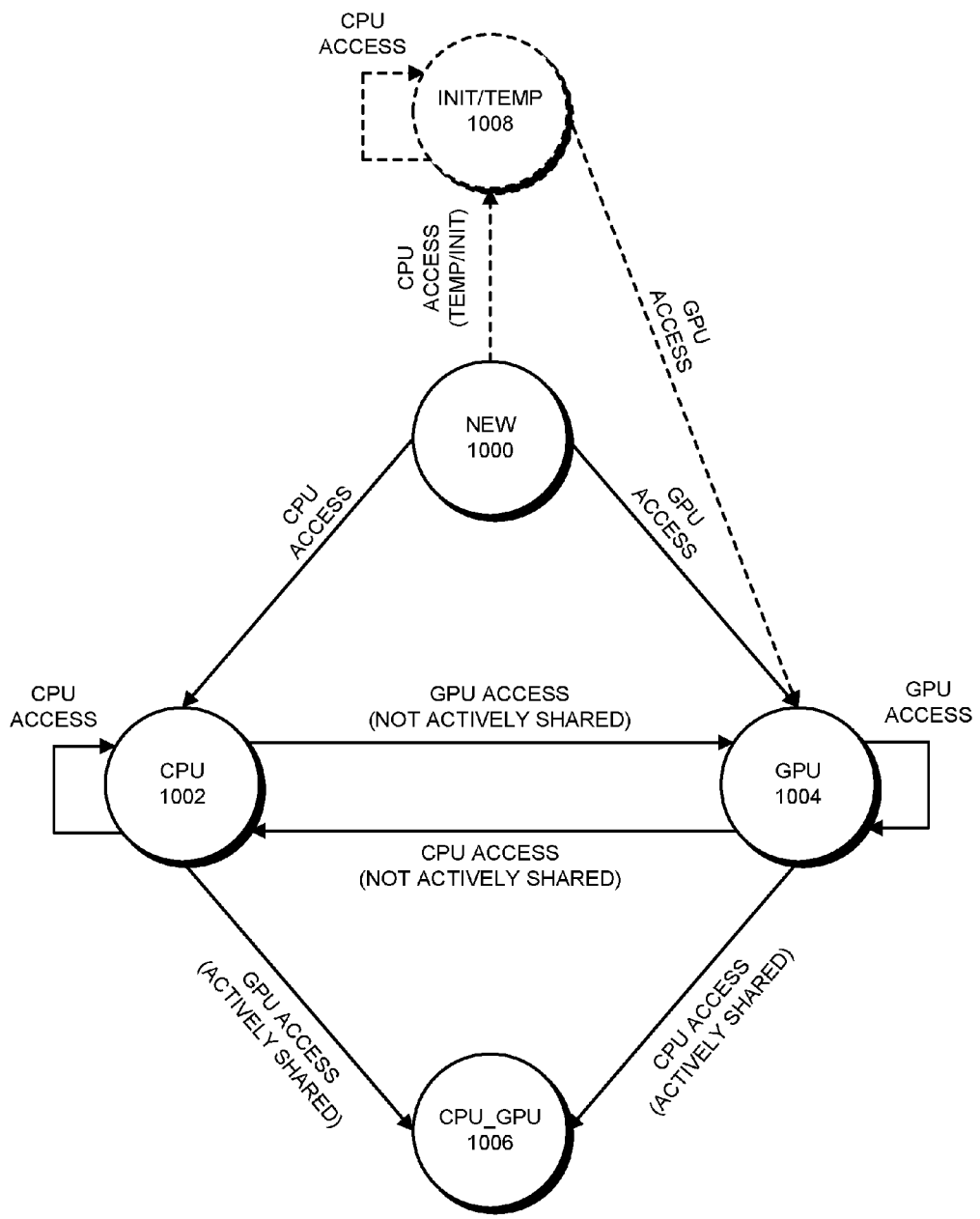
FIG. 10 presents a state diagram illustrating state transitions for a cache coherency indicator in accordance with some embodiments.

FIG. 10 presents a state diagram illustrating transitions for a cache coherency indicator in accordance with some embodiments. Note that the operations shown in FIG. 10 are presented as a general example of operations performed by some embodiments. The operations performed by other embodiments include different operations and/or operations that are performed in a different order. For example, although not shown in FIG. 10, in some embodiments, a state transition from CPU_GPU 1006 to GPU 1004 and/or CPU 1002 can be made under corresponding conditions. As another example, in some embodiments, a state transition from NEW 1000 to CPU_GPU 1006 can be made under corresponding conditions.

The cache coherency indicator starts in, or as, NEW 1000. In this state, the cache coherency indicator is unset or set to a default value, such as when the corresponding page of data has just been loaded from mass storage device 108 to memory 106 or has been newly created in memory 106. Depending on whether the data in the page is accessed by a CPU 110 or GPU 104 (i.e., a CU 112 in GPU 104), the cache coherency indicator transitions from (i.e., is set by an operating system to) NEW 1000 to CPU 1002 or GPU 1004. During subsequent operation, from CPU 1002 or GPU 1004, when the same type of processor accesses data in the corresponding page in memory 106, the cache coherency indicator remains in the same state. For example, this is shown by the "CPU access" arrow that exits and reenters CPU 1002. On the other hand, from CPU 1002 or GPU 1004, when a different type of processor accesses data in the corresponding page in memory 106 and the page is not being actively shared, the cache coherency indicator transitions to the opposite state. For example, this is shown by the "CPU access (not actively shared)" arrow that exits GPU 1004 and enters CPU 1002. As described above, switching the cache coherency indicator involves performing corresponding operations to ensure that only the transitioned-to processor type has access to data in the corresponding page in memory 106. In addition, from CPU 1002 or GPU 1004, when a different type of processor accesses data in the corresponding page in memory 106 and the page is being actively shared (i.e., accessed by both CPU(s) 110 and CU(s) 112 in GPU 104), the cache coherency indicator transitions to CPU_GPU 1006. For example, this is shown by the "CPU access (actively shared)" arrow that exits GPU 1004 and enters CPU_GPU 1006. Recall that, in the CPU_GPU state, both CPUs 110 and CUs 112 in GPU 104 have access to data in the corresponding page in memory 106, and so CPUs 110 and CUs 112 in GPU 104 will perform a coherency operation (i.e., perform hardware directory lookups).

In addition to the other states in FIG. 10, the INIT/TEMP 1008 state is an optional state (illustrated using hashed lines) that can be entered from NEW 1000 under corresponding circumstances. For example, as described above, INIT/TEMP 1008 may be transitioned to when it is known that a CPU 110 is initializing data in the corresponding page in memory 106 (or otherwise accessing the page of memory) under the condition that a CU 112 in GPU 104 will eventually process the data in the corresponding page in memory 106—and the CPU 110 will not cache data from the corresponding page in memory 106. From INIT/TEMP 1008, when a CPU 110 accesses data in the corresponding page in memory 106, the cache coherency indicator remains in the same state. For example, this is shown by the "CPU access" arrow that exits and reenters INIT/TEMP 1008. On the other hand, from INIT/TEMP 1008, when the GPU 104 accesses data in the corresponding page in memory 106, the cache coherency indicator transitions to GPU 1004. For example, this is shown by the "GPU access" arrow that exits INIT/TEMP 1008 and enters GPU 1004.

In some embodiments, a computing device (e.g., computing device 100 in FIG. 1 and/or some portion thereof) uses code and/or data stored on a non-transitory computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations.

Although "first" and "second" types of processors are used when describing the embodiments, the labels first and second are merely used for convenience. No particular type of processor is associated with the first or second types. For example, the first type of processor described herein needn't always be a CPU 110, but may be a CU 112, an embedded processor, a media processor, etc. depending on the processors present in the particular embodiment. In addition, there may be third types of processors, fourth types, etc. Generally, the described embodiments function with any number or arrangement of types of processors.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for handling cache coherency in a computing device, the computing device including two or more types of processors and a memory, the method comprising:
    setting a cache coherency indicator in metadata in a page table entry in a page table, the page table entry comprising information about a page of data that is stored in the memory, and the cache coherency indicator indicating whether data in the page of data in the memory can be accessed without performing a coherency operation for the data with corresponding types of processors; and
    using the cache coherency indicator to determine operations to be performed when accessing data in the page of data in the memory.

2. The method of claim 1, further comprising:
    based on a request from a processor of a first type, retrieving the page of data from a mass storage or newly creating the page of data in the memory;
    storing the page of data in the memory; and
    adding, to the page table, the page table entry with the information about the page of data in the memory, the adding comprising:
        setting the cache coherency indicator in the metadata for the page table entry to indicate the first type of processor.

3. The method of claim 2, wherein using the cache coherency indicator to determine operations to be performed when accessing data in the page of data in the memory comprises:
    receiving, from a processor of the first type, an access request to access data in the page of data in the memory;
    determining, based on the metadata for the page table entry, that the cache coherency indicator indicates the first type of processor; and
    accessing, for the processor of the first type, the data in the page of data in the memory without performing a coherency operation for the data with other types of processors.

4. The method of claim 2, wherein using the cache coherency indicator to determine operations to be performed when accessing data in the page of data in the memory comprises:
    receiving, from a processor of a second type, an access request to access data in the page of data in the memory;
    determining, based on the metadata for the page table entry, that the cache coherency indicator indicates the first type of processor;
    causing each processor of the first type to release cached copies of data from the page of data in the memory and invalidate copies of the page table entry;
    switching the cache coherency indicator for the page table entry to indicate the second type of processor; and
    accessing, for the processor of the second type, the data in the page of data in the memory.

5. The method of claim 2, further comprising, after setting the cache coherency indicator in the metadata for the page table entry to indicate the first type of processor:
    determining that the page of data in the memory is being shared between processors of the first type and the second type; and
    updating the cache coherency indicator for the page table entry to indicate both of the first type of processor and the second type of processor.

6. The method of claim 5, wherein using the cache coherency indicator to determine operations to be performed when accessing data in the page of data in the memory comprises:
    receiving, from a processor of the first type or the second type, an access request to access data in the page of data in the memory;
    determining, based on the metadata for the page table entry, that the cache coherency indicator indicates both of the first type of processor and the second type of processor;
    performing a coherency operation for the data with other types of processors; and
    accessing, for the first type of processor or the second type of processor, the data in the page of data in the memory.

7. The method of claim 5, wherein determining that the page of data in the memory is being shared between processors of the first type and the second type comprises:
    receiving, during a runtime of the computing device, a specified rate and/or one or more updates of the specified rate from a software or hardware entity in the computing device; and
    determining that the page of data is being shared when the cache coherency indicator for the page table entry has been switched between indicating the first type of processor and the second type of processor at a rate greater than the specified rate.

8. The method of claim 1, wherein the two or more types of processors comprise a central processing unit (CPU) and a graphics processing unit (GPU).

9. A computing device, comprising:
    two or more types of processors; and
    a memory, the memory storing a page table and a page of data;
    wherein the computing device is configured to:
        set a cache coherency indicator in metadata in a page table entry in the page table, the page table entry comprising information about the page of data stored in the memory, and the cache coherency indicator indicating whether data in the page of data in the memory can be accessed without performing a coherency operation for the data with corresponding types of processors; and use the cache coherency indicator to determine operations to be performed when accessing data in the page of data in the memory.

10. The computing device of claim 9, wherein the computing device is further configured to:

based on a request from a processor of a first type, retrieve the page of data from a mass storage or newly creating the page of data in the memory;

store the page of data in the memory; and add, to the page table, the page table entry with the information about the page of data in the memory, the adding comprising:

set the cache coherency indicator in the metadata for the page table entry to indicate the first type of processor.

11. The computing device of claim 10, wherein, when using the cache coherency indicator to determine operations to be performed when accessing data in the page of data in the memory, the computing device is further configured to:

receive, from a processor of the first type, an access request to access data in the page of data in the memory;

determine, based on the metadata for the page table entry, that the cache coherency indicator indicates the first type of processor; and access, for the processor of the first type, the data in the page of data in the memory without performing a coherency operation for the data with other types of processors.

12. The computing device of claim 10, wherein, when using the cache coherency indicator to determine operations to be performed when accessing data in the page of data in the memory, the computing device is further configured to:

receive, from a processor of a second type, an access request to access data in the page of data in the memory;

determine, based on the metadata for the page table entry, that the cache coherency indicator indicates the first type of processor;

cause each processor of the first type to release cached copies of data from the page of data in the memory and invalidate copies of the page table entry;

switch the cache coherency indicator for the page table entry to indicate the second type of processor; and access, for the processor of the second type, the data in the page of data in the memory.

13. The computing device of claim 10, wherein, after setting the cache coherency indicator in the metadata for the page table entry to indicate the first type of processor, the computing device is further configured to:

determine that the page of data in the memory is being shared between processors of the first type and the second type; and update the cache coherency indicator for the page table entry to indicate both of the first type of processor and the second type of processor.

14. The computing device of claim 13, wherein, when using the cache coherency indicator to determine operations to be performed when accessing data in the page of data in the memory, the computing device is further configured to:

receive, from a processor of the first type or the second type, an access request to access data in the page of data in the memory;

determine, based on the metadata for the page table entry, that the cache coherency indicator indicates both of the first type of processor and the second type of processor;

perform a coherency operation for the data with other types of processors; and access, for the first type of processor or the second type of processor, the data in the page of data in the memory.

15. The computing device of claim 13, wherein, when determining that the page of data in the memory is being shared between processors of the first type and the second type, the computing device is further configured to:

receive, during a runtime of the computing device, a specified rate and/or one or more updates of the specified rate from a software or hardware entity in the computing device; and determine that the page of data is being shared when the cache coherency indicator for the page table entry has been switched between indicating the first type of processor and the second type of processor at a rate greater than the specified rate.

16. The computing device of claim 9, wherein the two or more types of processors comprise a central processing unit (CPU) and a graphics processing unit (GPU).

17. A memory, comprising:

a plurality of memory circuits;

wherein the memory circuits store a page table, the page table comprising a page table entry comprising information about a page of data, the information comprising a cache coherency indicator;

wherein the cache coherency indicator comprises an indication of which of a plurality of types of processors are not permitted to access data in the page of data in the memory.

18. The memory of claim 17, wherein the cache coherency indicator is configured to be set to a corresponding value to indicate:

a single type of processor, wherein the single type of processor is permitted to access data in the page of data and other types of processors are not permitted to access data in the page of data.

19. The memory of claim 17, wherein the cache coherency indicator is configured to be set to a corresponding value to indicate:

two or more types of processors, wherein the two or more types of processors are permitted to access data in the page of data and other types of processors are not permitted to access data in the page of data.

20. The memory of claim 17, wherein the cache coherency indicator is configured to be set to a corresponding value to indicate:

that a first type of processor is initializing or temporarily accessing data in the page of data in the memory, but that a second type of processor will access data in the page of data.

* * * * *